United States Patent [19]

Steinberg

[11] 4,425,972
[45] Jan. 17, 1984

[54] SPLIT RING SPRING FOR EARTH WORKING TOOL

[75] Inventor: Richard W. Steinberg, North Mankato, Minn.

[73] Assignee: Hiniker Company, Mankato, Minn.

[21] Appl. No.: 291,393

[22] Filed: Aug. 10, 1981

[51] Int. Cl.³ .............................................. A01B 61/04
[52] U.S. Cl. ..................................... 172/551; 172/711
[58] Field of Search ............... 172/705, 710, 711, 707, 172/708, 142, 462, 498, 499, 497, 336, 335, 347, 500, 551, 570, 572, 573, 657, 643, 547; 16/72, 73, 75

[56] References Cited

U.S. PATENT DOCUMENTS

| 211,003 | 12/1878 | Dunbar | 172/711 |
|---|---|---|---|
| 284,278 | 9/1883 | Cobb . | |
| 301,163 | 7/1884 | Rix . | |
| 392,695 | 11/1888 | Sheldon | 172/462 |
| 691,571 | 1/1902 | La Dou | 172/711 |
| 692,939 | 2/1902 | Stanton . | |
| 1,228,695 | 6/1917 | Ogle . | |
| 1,249,008 | 12/1917 | Bonds, Jr. . | |
| 2,252,593 | 8/1941 | Bruene | 97/55 |
| 2,493,811 | 1/1950 | Graham | 97/184 |
| 2,627,798 | 2/1953 | Graham | 97/184 |
| 2,701,512 | 2/1955 | Haynes | 97/216 |
| 2,712,780 | 7/1955 | Graham | 97/47.84 |
| 2,756,662 | 7/1966 | Christensen | 97/245 |
| 3,227,226 | 1/1966 | Bayne | 172/705 |
| 3,608,646 | 9/1971 | Ryan | 172/500 |
| 3,627,063 | 12/1971 | Ryan | 172/627 |
| 3,734,201 | 5/1973 | Zaun | 172/551 |
| 3,923,103 | 12/1975 | Davis et al. | 172/201 |
| 3,967,685 | 7/1976 | Siekmeier | 172/573 |
| 4,005,757 | 2/1977 | Hess | 172/710 |
| 4,011,916 | 3/1977 | Neal et al. | 172/710 |
| 4,102,406 | 7/1978 | Orthman | 172/540 |
| 4,194,575 | 3/1980 | Whalen | 172/551 |

FOREIGN PATENT DOCUMENTS

| 918689 | 12/1963 | France . | |
| 930985 | 7/1964 | France . | |
| 25031 | of 1898 | United Kingdom | 172/711 |

OTHER PUBLICATIONS

Hiniker Rotary Hoe Brochure.

Primary Examiner—Richard J. Johnson
Attorney, Agent, or Firm—Burd, Bartz & Gutenkauf

[57] ABSTRACT

An earthworking tool having a biased trip assembly for yieldably holding the tool in a ground working position, allowing the tool to move over an obstacle, and return the tool to its earthworking position. The trip assembly has a stationary hinge member mounted to a support and a movable hinge member pivoted to the stationary member. A split sleeve spring surrounding the stationary and movable hinge members biases the members and earthworking tool to a ground working position. A modified trip assembly has a pair of split ring springs surrounding a stationary hinge member and movable hinge member to bias the movable member and earthworking tool attached thereto to a ground working position. An arm connected to the movable member rotatably supports a rotary hoe wheel.

47 Claims, 12 Drawing Figures

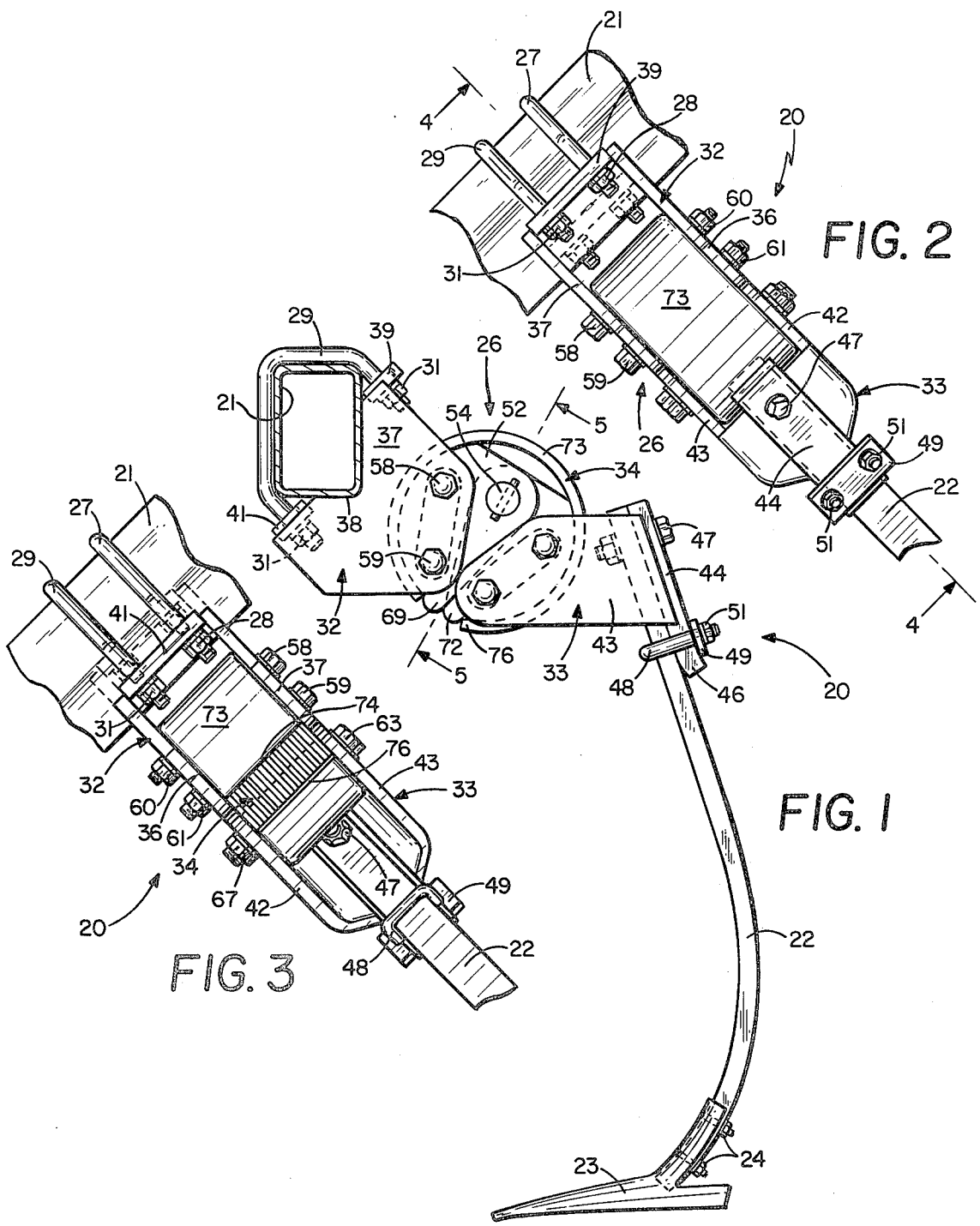

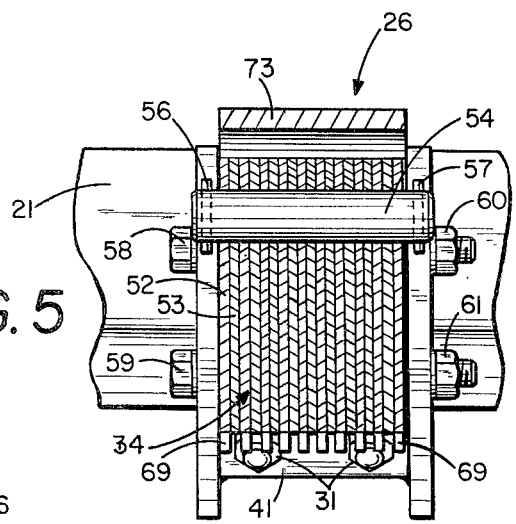
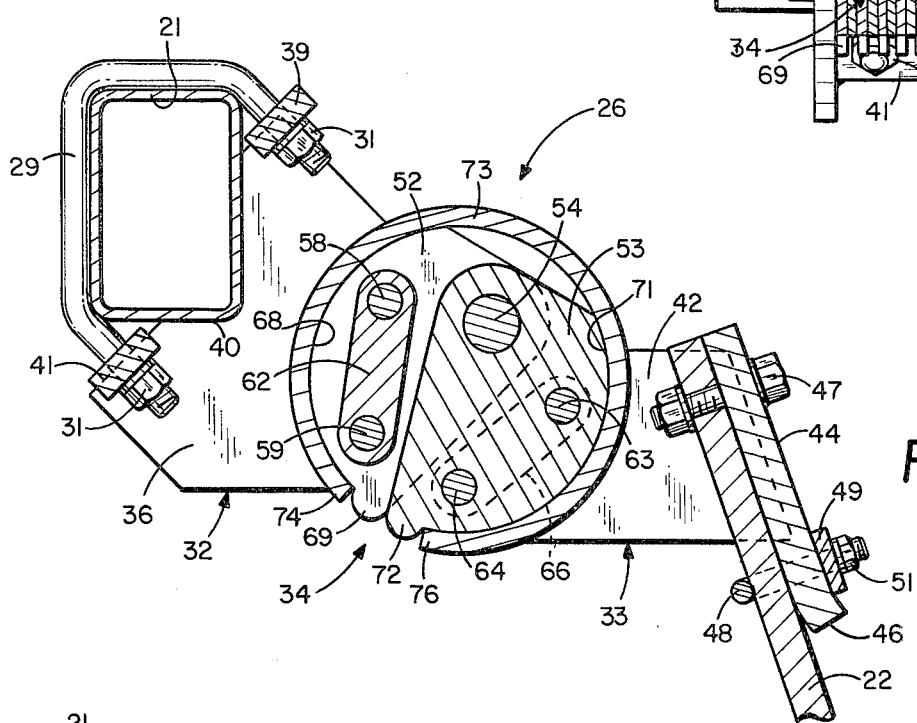
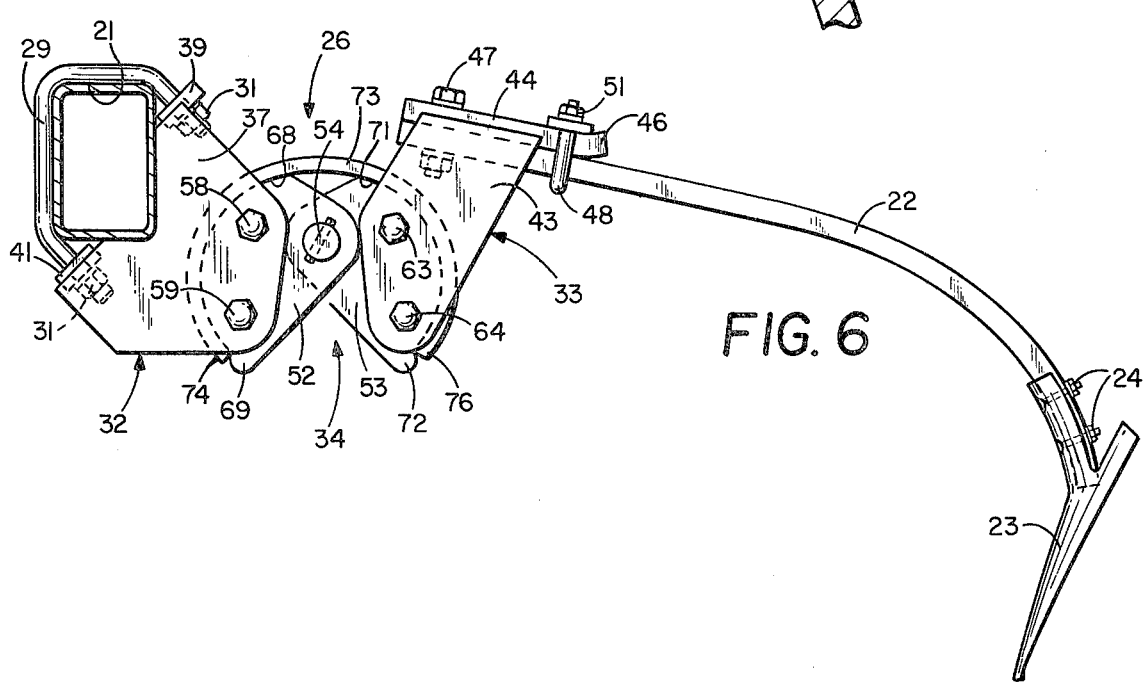

SPLIT RING SPRING FOR EARTH WORKING TOOL

BACKGROUND OF THE INVENTION

Agricultural chisel plows and field cultivators are equipped with a plurality of earthworking tools that are moved through the soil to break and roll the soil in preparation of a seedbed. The earthworking tools are mounted on frames and tool bars with clamps having spring trip mechanisms. The spring of a trip mechanism is deflected when the tool hits an obstacle so that the tool moves to a trip position and rides over the obstacle. The biasing force of a deflected spring increases in relation to the amount of deflection. This increases the forces on the tool as it moves from the earthworking position to the trip position. These forces can cause bending and breakage of the tool. Example of spring trip mechanisms for earthworking tools are disclosed in U.S. Pat. Nos. 2,712,780; 4,005,757 and 4,011,916.

SUMMARY OF INVENTION

The invention is directed to a spring biased trip assembly for mounting an earthworking tool to a support, such as a tool bar. The spring biased trip assembly has a stationary hinge member pivotally connected to a movable hinge member. Biasing means mounted on the stationary member and movable member yieldably hold the tool in a ground working position and allows the tool to move to a trip position. The biasing means comprises a split sleeve spring surrounding and mounted on outer portions of the pivot members. On movement of the movable pivot member relative to the stationary pivot member, the split sleeve spring is expanded and applies a substantially constant biasing force on ground engaging means of the earthworking tool. The biasing means allows the tool to move upwardly to ride over an obstacle in the ground and forces the ground engaging means back into the ground after it has passed the obstacle without subjecting the tool to extreme forces that can cause bending and breakage of the tool.

A modification of the trip assembly has a stationary member mountable on a fixed support, such as a tool bar. A movable member is pivoted to the fixed member. Biasing means comprising a pair of split rings cooperates with the stationary member and movable member to bias the movable member to a first ground working position. An arm joined to the movable member carries an earthworking tool, such as a rotary hoe wheel. The rotary hoe wheel and arm can move upwardly against the biasing force of the split ring means to allow the rotary hoe wheel to pass over an obstruction in or on the ground.

IN THE DRAWINGS

FIG. 1 is a side elevational view of the earthworking tool having the trip assembly of the invention showing the tool in the ground working position;

FIG. 2 is a foreshortened top view of FIG. 1;

FIG. 3 is a foreshortened bottom view of FIG. 1;

FIG. 4 is an enlarged sectional view taken along the line 4—4 of FIG. 2;

FIG. 5 is an enlarged sectional view taken along the line 5—5 of FIG. 1;

FIG. 6 is a view similar to FIG. 1 showing the earthworking tool and trip assembly in the trip position;

DESCRIPTION OF A PREFERRED EMBODIMENT

Figure 8:
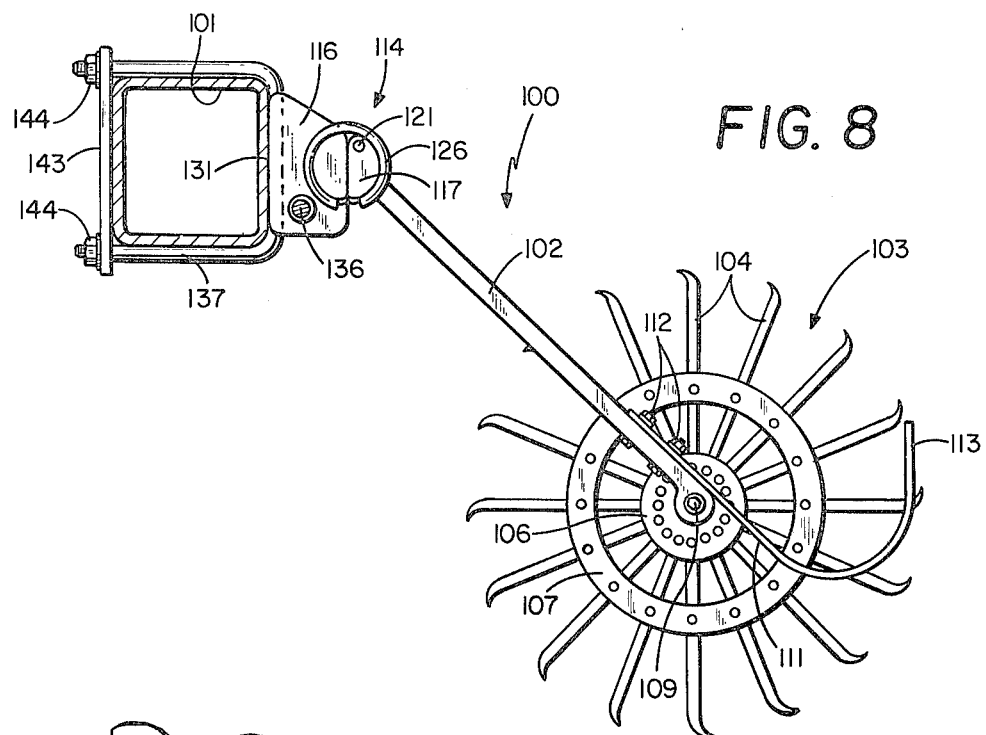
FIG. 8 is a sectional view taken along line 8—8 of FIG. 7.

Referring to the drawing, there is shown in FIGS. 1-3 an earthworking tool indicated generally at 20 equipped with the trip assembly 26 of the invention yieldably holding tool 20 in a normal earthworking position. Tool 20 is mounted on a transverse tool bar 21. Tool bar 21 is a conventional tool bar that forms part of the framework of a chisel plow. Tool bar 21 can be mounted on a tractor with a three-point hitch. The tool bar 21 can be part of the frame of a trailer-type earthworking implement or a tool bar of a field cultivator.

Tool 20 has a downwardly curved shank or arm 22 having a lower end attached to a shovel 23 with a pair of plow bolts 24. A pair of U-bolts 27 and 29 attach tool 20 to tool bar 21. Nuts 28 and 31 associated with U-bolts 27 and 29 clamp a first or stationary member 32 to tool bar 21. A second movable member 33 is hinged with a biased hinge assembly 34 to first member 32 to allow movement of shank 22 from a ground working position, as shown in FIG. 1, to an elevated or trip position, as shown in FIG. 6. When tool 20 engages an obstacle, such as a rock, it swings rearwardly and upwardly to the trip position allowing shovel 23 to ride over the obstacle. As soon as shovel 23 clears the obstacle, biased hinge assembly returns tool 20 to its normal earthworking position.

First member 32, shown in FIGS. 2 and 3, has a pair of side members or plates 36 and 37 secured to bars 39 and 41. Plates 36 and 37 have steps or cut-outs 38 and 40, respectively to accommodate a corner section of tool bar 21. Bars 39 and 41 have holes for accommodating the ends of U-bolts 27 and 29. Nuts 28 and 31, threaded onto U-bolts 27 and 29, engage bars 39 and 41 to clamp first member 32 onto tool bar 21.

Second member 33 has a pair of side members or plates 42 and 43 secured to a shank bar 44. Shank bar 44 has a lower end with a downwardly and rearwardly curved lip 46 which allows for rearward flexing of shank 22. A nut and bolt assembly 47 secures the upper end of shank 22 to shank bar 44. A U-bolt 48, extended through a cross bar 49 and nuts 51 on U-bolt 48, clamp the lower end of shank bar 44 to shank 22.

Referring to FIGS. 4 and 5, trip assembly 34 is a spring biased mount having a plurality of side-by-side plates 52 and 53 pivotally joined together with a transverse pivot pin 54. Retainers 56 and 57, such as split sleeves, hold pin 54 in assembled relation with plates 52 and 53. As shown in FIG. 5, there are 10 plates 52. Adjacent plates are spaced from each other with 9 plates 53. Other numbers of alternately arranged plates can be used in hinge assembly 34. A pair of bolts 58 and 59 extend through spaced holes in plates 52 and holes in side members 36 and 37. Nuts 60 and 61 threaded on bolts 58 and 59 secure plates 52 to the side members 36 and 37. A spacer bar 62 has holes for accommodating bolts 58 and 59, as shown in FIG. 4. A spacer bar 62 is located between adjacent plates 52 in alignment with plates 53. A pair of bolts 63 and 64 extend through holes in plates 53 and side members 42 and 43 to mount the plates 53 on side members 43. Bolts 63 and 64 extend through spacers 66 located between adjacent plates 63. Nuts 67 are threaded onto bolts 63 and 64 to retain the bolts 63 and 64 in assembled relation with plates 53 and side members 42 and 43.

As shown in FIG. 4, each hinge plate 52 has an arcuate curved outer edge 68 and a downwardly extended projection or ear 69. Each hinge plate 53 has an arcuate curved outer edge 71 and a downwardly directed projection or ear 72. The curved edges 68 and 71 are opposed from each other and have generally the same convex arcuate curvature. A biasing means in the form of a generally C-shaped split sleeve spring 73 is located over plates 52 and 53. Inside curved surface of spring 73 engages the outer arcuate edges 68 and 71 of plates 52 and 53 to mount spring on plates 52 and 53. Spring 73 has a first end 74 located adjacent ears 69. The second end 76 of spring 73 is located adjacent ears 72. Spring 73 is a cylindrical split sleeve having a width that covers hinge plates 52 and 53 and fits between plates 36 and 37 and between plates 42 and 43. The spring 73 biases hinge plates 52 and 53 toward each other to yieldably hold shank 22 and shovel 23 in a ground working position. When shank 22 and shovel 23 are in the ground working position, as shown in FIG. 1, plate 43 engages a lower edge of fixed plate 37 and plate 42 engages a lower edge of plate 36. The fixed plates 36 and 37 are stops for the movable member 33 and limit movement of shank 22 in the down or normal earthworking direction. Spring 73 is pre-tensioned when shank 22 is in the earthworking position. In other words, spring 73 exerts a continuous biasing force on hinge plates 52 and 53.

In use, when shovel 23 engages an obstacle, such as a rock, shank 22 is flexed in a rearward direction. The movement of earthworking tool 20 in a forward direction causes shank 22 to pivot or swing upwardly about the pivot axis of the hinge pin 54. Curved lip 46 allows shank 22 to bend rearwardly when it hits an obstacle. The second member 33 being secured to the hinge plates 53 pivots with hinge plates 53 about hinge pin 54. The projections 72 engage spring end 76 and move the end in a direction to expand spring 73. During expansion of spring 73 the end 76 is moved away from end 74 and the metal of spring 73 is deflected causing a reaction or biasing force. The vertical torque arm between hinge pivot 54 and the end 76 of the spring decreases as the spring expands. This causes spring 73 to maintain a substantially constant biasing force on the shank 22 as it moves from its earthworking position, shown in FIG. 1, to its up or trip position, shown in FIG. 6. When shovel 23 has moved over the obstacle, the biasing force of spring 73 on hinge plates 53 causes the shank 22 to pivot about the axis of hinge pin 54 in a direction to return shank 22 and shovel 23 to its earthworking position. This tripping action of the biasing hinge assembly 34 is operable without raising the earthworking tool 20 out of the ground or stopping the forward movement of the implement.

Figure 7:
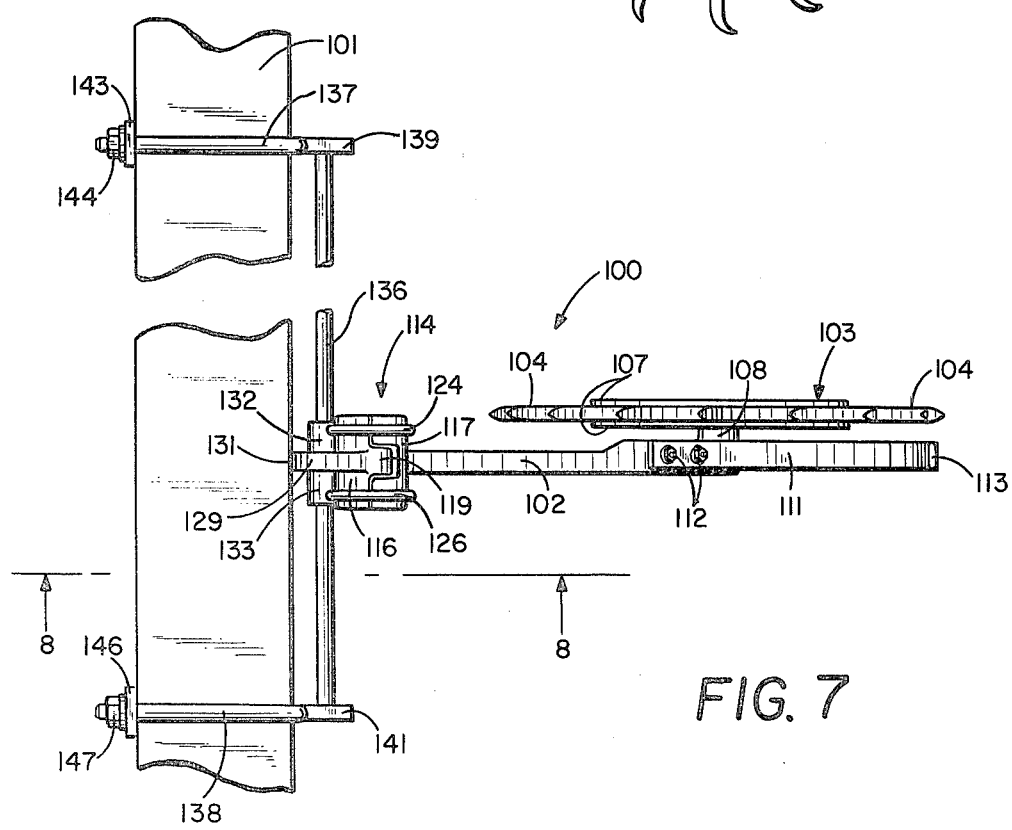
FIG. 7 is a foreshortened top view of a rotary hoe earthworking tool having a modified trip assembly of the invention.

Referring to FIGS. 7 and 8, there is shown a modification of the biased hinge or trip assembly used in association with a rotary hoe earthworking tool. The earthworking tool indicated generally at 100 is connected to a transverse tool bar or frame 101. Tool bar 101 is the conventional tool bar mounted with a three-point hitch to a draft tractor. Earthworking tool 100 has an elongated shank or arm 102 for rotatably supporting a rotary hoe wheel 103. Other types of earthworking tools, such as the shovel shown in FIG. 1, can be mounted on arm 102. Rotary hoe wheel 103 has a plurality of radial outwardly directed spoon bill teeth 104 attached to a central hub 106. A pair of annular rings 107 are secured with nut and bolt assemblies to mid-portions of the teeth 104. Hub 106 is located adjacent a lateral boss 108 on the lower end of arm 102. A nut and bolt assembly 109 secures hub 106 to boss 108. A trash removing strap or stripper 111 is secured with nut and bolt assemblies 112 to the lower end of arm 102. Strap 111 has a rearwardly and upwardly curved outer end 113 having an arcuate convex surface to facilitate the stripping of trash from the teeth 104.

Figure 9:
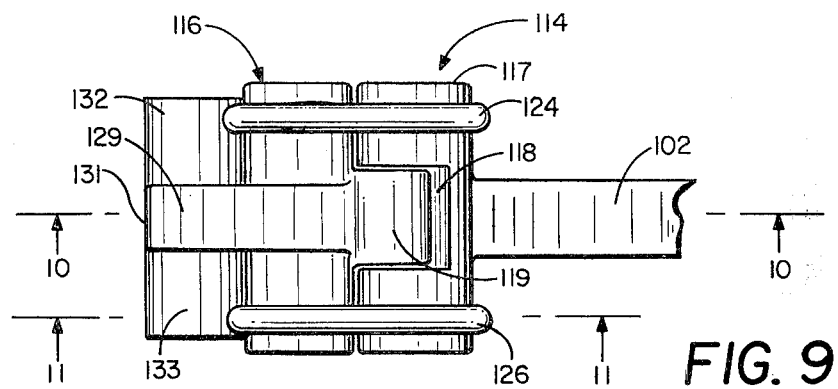
FIG. 9 is an enlarged top view of the trip assembly of FIG. 7.
Figure 10:
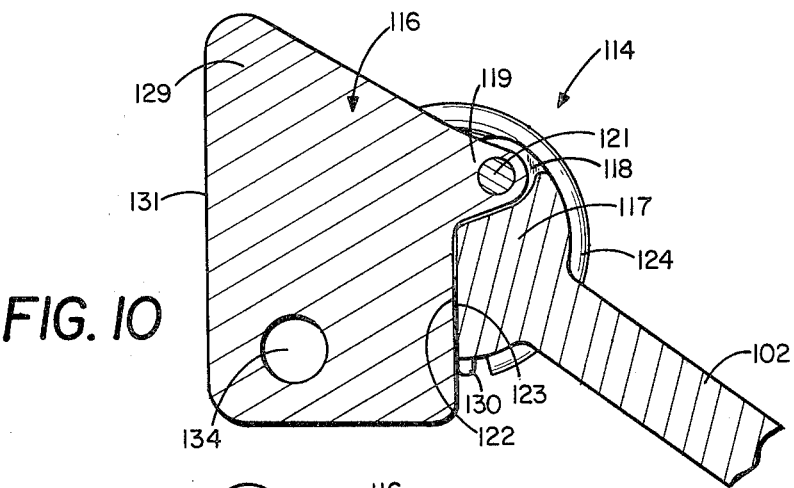
FIG. 10 is an enlarged sectional view taken along the line 10—10 of FIG. 9.
Figure 11:
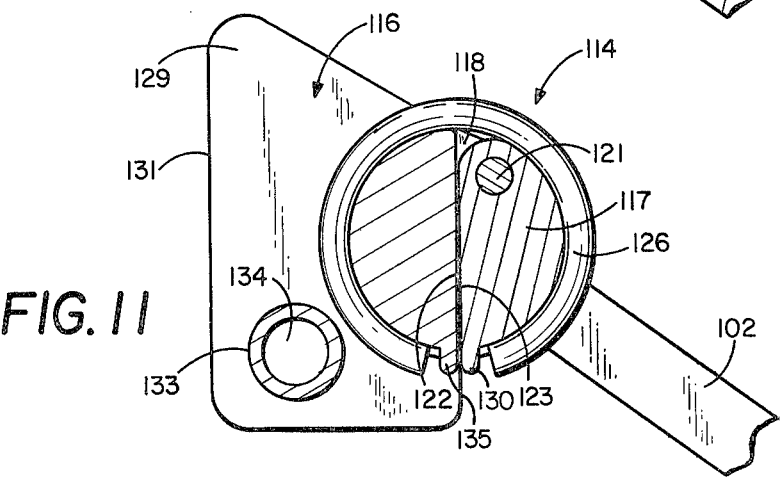
FIG. 11 is an enlarged sectional view taken along the line 11—11 of FIG. 9.
Figure 12:
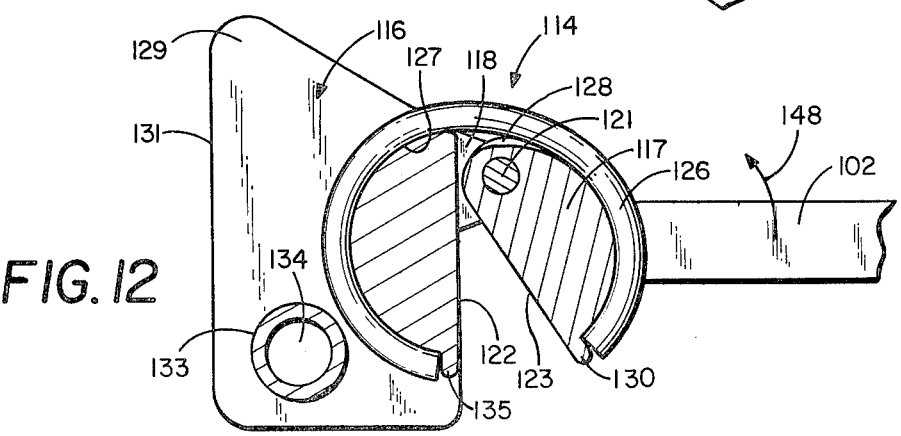
FIG. 12 is a view similar to FIG. 11 showing the trip assembly in the trip position.

A trip or biased hinge assembly indicated generally at 114 is associated with the upper end of arm 102 and yieldably retains arm 102 in its down earthworking position. Assembly 114 is a spring biased mount having a first stationary member 116 and a second movable member 117. As shown in FIG. 9, movable member 117 has a central recess 118 accommodating a rearwardly directed projection 119 on stationary member 116. A transverse pivot pin 121 extends through projection 119 and is pivotally mounted on opposite portions or semicircular hubs of movable member 117. Arm 102 joined to member 117 pivots about the transverse generally horizontal axis of a pivot pin 121. Stationary member 116 has an upright rear stop surface 122 located on opposite sides of projection 119. Movable member 117 has flat upright surfaces 123 that faces and engages surfaces 122. As shown in FIGS. 10 and 11, when arm 102 is in the down or earthworking position, surfaces 122 and 123 engage each other. When the arm 102 moves to its trip or raised position, as shown in FIG. 12, surface 123 on movable member 117 moves away from surface 122 on stationary member 116.

A biasing means comprising a pair of C-shaped ring springs 124 and 126 function to bias movable member 117 and arm 102 to the down or earthworking position. Springs 124 and 126 are pre-tensioned so that arm 122 is held in the earthworking position. Members 116 and 117 have semi-cylindrical hubs having outer cylindrical or arcuate surfaces containing arcuate grooves 127 and 128 to accommodate the lower portions of C-shaped ring springs 124 and 126. As shown in FIGS. 11 and 12, members 116 and 117 have stops or projections 135 and 130, respectively, at the opposite ends of grooves 127 and 128 to retain spring 126 in grooves 127 and 128. The opposite ends of C-shaped ring spring 126 bear against projections 130 and 135 when the spring is expanded, as shown in FIG. 12. Members 116 and 117 have similar stops or projections at the opposite the ends of the grooves accommodating the ring spring 124.

Stationary member 116 has an upright central rib 129 having an upright forward face or surface 131. Horizontal cylindrical bosses 132 and 133 project outwardly from lower portions of rib 129. Bosses 132 and 133 and rib 129 has a transverse bore 134 accommodating a support rod 136. As shown in FIG. 7, support rod 136 is secured to tool bar 101 with a pair of U-shaped clamp members or U-bolts 137 and 138. Plates 139 and 141 secured to the U-bolts are mounted to opposite ends of rod 136. As shown in FIGS. 7 and 8, a plate 143 and nuts 144 clamp U-bolt 137 to tool bar 101. A similar plate 146 and nuts 147 clamp U-bolt 138 to tool bar 101. Other types of clamp structures can be used to attach assembly 114 to the tool bar 101. Additional earthworking tools 100 with associated assemblies 114 can be mounted on the rod 136. Arms 102 of adjacent tools can have different lengths so that the rotary hoe wheels 103 are located in a staggered or off-set arrangement.

In use, the hinge assembly 114 is normally retained in the closed position, as shown in FIGS. 8, 10 and 11, by the C-shaped springs 124 and 126. The springs 124 and 126, being located about arcuate outer surfaces of members 116 and 117, hold stop surface 123 in engagement with the member 116. When the rotary hoe wheel 103 engages an obstacle, such as a rock or hard packed soil, arm 102 will independently move upwardly of the remaining arms of the implement against the biasing force of the C-shaped springs 124 and 126. As shown in FIG. 12, arm 102 moves upwardly, as indicated by the arrow 148, about the transverse pivot axis of pivot pin 121. As the arm 102 moves upwardly, the C-shaped springs 124 and 126 are expanded or elongated. The biasing force of the C-shaped springs 124 and 126 is substantially constant, as the arm 102 moves from its down earthworking position to its up or raised position. When the rotary hoe wheel 103 is free of the obstacle, springs 124 and 126 return arm 102 to the down ground working position. Springs 124 and 126 yieldably hold the movable member 117 in engagement with the flat upright stop surface 122 of the fixed member 116. This determines the down or earthworking position of arm 102 and rotary hoe wheel 103.

While there has been shown and described two preferred embodiments of the trip assembly of the invention, it is understood that changes in the structure, arrangement of structure, and parts may be made by those skilled in the art without departing from the invention. The trip assembly is useable as a yielding mount for a ground engaging wheel or a roller of a belt tightener. The invention is defined in the following claims.

The embodiments of the invention in which an exclusive property or privilege is claimed are defined as follows:

1. A mount assembly for an earthworking tool attachable to a support comprising: first means having a first convex curved outer surface and an outward directed first projection; means adapted to connect the first means to the support; second means having a second convex curved outer surface generally opposite the convex curved outer surface of the first means and an outward directed second projection, said first and second convex curved outer surfaces being oriented in a generally circular arrangement with the first and second projections being located adjacent each other; pivot means pivotally connected the first means to the second means for movement about an axis from a first position to a second position, said first and second means having portions engageable with each other when the second means is in the first position, said portions being separated from each other when the second means is in the second position, means adapted to connect an earthworking tool to the second means whereby the tool is located in an earthworking position when the second means is in the first position and in a trip position when the second means is in the second position, said tool moving about said axis between the earthworking position and the trip position; and C-shaped split spring means mounted on the first means and second means, said spring means having a first end engageable with the first projection, a second end engageable with the second projection, and an inside arcuate surface engageable with the outer convex curved surfaces of the first and second means whereby the spring means is mounted on the first and second means and biases the second means to the first position and thereby biases the earthworking tool to its earthworking position.

2. The assembly of claim 1 wherein:
said means adapted to connect the first means to the support includes plate means located adjacent opposite portions of the first means, means connecting the plate means to the first means, and means adapted to mount the plate means on the support.

3. The assembly of claim 2 wherein:
said first means comprises a plurality of plates.

4. The assembly of claim 3 wherein:
said plate means has a first member adjacent one side of said plates and a second member adjacent the other side of said plates, said means connecting the plate means to the first means comprising fastening means connecting the first and second members to the plurality of plates.

5. The assembly of claim 4 including:
spacer means located between adjacent plates to separate adjacent plates from each other.

6. The assembly of claim 4 wherein:
said second means includes a plurality of second plates having portions located between adjacent plates of said plurality of plates of the first means.

7. The assembly of claim 6 wherein:
said pivot means comprises a pivot pin extended through aligned holes in the plates of the first means and the second plates.

8. The assembly of claim 1 wherein:
the second means includes a plurality of plates, said pivot means pivotally connecting said plates to the first means.

9. The assembly of claim 1 wherein:
the means adapted to connect the tool to the second means includes side members located adjacent opposite portions of the second means, means connecting the side members to the second means, and means connecting the side members to the tool.

10. The assembly of claim 9 wherein:
the second means includes a plurality of plates located between the side members, said pivot means pivotally connecting said plates to the first means, said means connecting the side members to the second means comprising fastening means connecting the side members to the plates.

11. The assembly of claim 10 wherein:
the first means includes a plurality of plates having portions located between adjacent plates of the second means.

12. The assembly of claim 11 wherein:
said pivot means comprises a pivot pin extended through aligned holes in the plates of the first and second means.

13. The assembly of claim 10 including:
spacer means located between adjacent plates to separate adjacent plates from each other.

14. The assembly of claim 1 wherein:
the first means has a pair of first hubs, each of said first hubs having a convex curved outer surface;
the second means has a pair of second hubs located adjacent said first hubs, each of said second hubs having a convex curved outer surface;

said spring means comprising a pair of split ring springs engageable with the convex curved outer surfaces of said first and second hubs.

15. The assembly of claim 14 wherein:
said outer surfaces of said first and second hubs have arcuate grooves accommodating said split ring springs.

16. The assembly of claim 14 wherein:
said second means has a recess located between the second hubs;
said first means having projection means located between the first hubs, said projection means extended into said recess, said pivot means comprising a pin located in aligned holes in said projection and second means.

17. The assembly of claim 14 wherein:
one of said first and second means has recess means, said other first and second means has projection means extended into the recess means, said pivot means comprising a pin located in aligned holes in said projection means and one of said first and second means.

18. The assembly of claim 14 including:
arm means secured to the second means, said earthworking tool comprising a rotary hoe wheel rotatably mounted on said arm means.

19. The assembly of claim 1 wherein:
said second means has recess;
said first means having projection means located in said recess, said pivot means comprising a pin located in aligned holes in said projection means and second means.

20. The assembly of claim 1 wherein:
one of said first and second means has recess means, said other first and second means has projection means extended into the recess means, said pivot means comprising a pin located in aligned holes in said projection means and one of said first and second means.

21. The assembly of claim 1 wherein:
the spring means comprises a split sleeve.

22. The assembly of claim 1 wherein:
the spring means comprises a plurality of split rings.

23. The assembly of claim 22 wherein:
the first means and second means have grooves accommodating the split rings.

24. The assembly of claim 1 wherein:
the first means comprises a plurality of first plates, first spacer means located between adjacent plates, means connecting the first plates and first spacer means, said second means comprises a plurality of second plates having portions located between adjacent first plates, second spacer mean located between adjacent second plates, means connecting the second plates and second spacer means, said pivot means comprising a pivot pin pivotally connecting the first plates and second plates;
said C-shaped split spring means surrounding said first plates and second plates.

25. The assembly of claim 24 wherein:
the spring means is a split sleeve.

26. A mount assembly for an earthworking tool attachable to a support comprising: a first hinge member, means adapted to mount the first hinge member on the support; a second hinge member; pivot means pivotally connecting the first hinge member to the second hinge member whereby the second hinge member moves about an axis between a first position and a second position, said first and second members having portions engaging each other when the second member is in the first position, said portions being separated from each other when the second member is in the second position; means adapted to connect an earthworking tool to the second hinge member whereby the tool moves about said axis between a first earthworking position when the second member is in the first position and a second trip position when the second member is in the second position; and C-shaped split spring means for biasing the second member to its first position to yieldably hold the second member in the first position with said portions engaging each other to locate the earthworking tool in the first earthworking position, said axis being disposed remotely opposite the ends of the C-shaped split spring means, said spring means allowing the second member to pivot from the first position to the second position when the tool hits an obstacle whereby said tool moves from the first earthworking position to the trip position, said spring means having an arcuate inside surface, said first hinge member having first arcuate means engageable with a first portion of said inside surface of the spring means, and said second hinge member having second arcuate means engageable with a second portion of said inside surface of the spring means whereby the spring means is mounted on said first and second hinge members.

27. The assembly of claim 26 wherein:
said means adapted to mount the first hinge member on the support includes plate means located adjacent opposite portions of the first hinge member, means connecting the plate means to the first hinge member, and means adapted to mount the plate means on the support.

28. The assembly of claim 27 wherein:
said first hinge member comprises a plurality of plates.

29. The assembly of claim 28 wherein:
said plate means has a first portion adjacent one side of said plates and a second portion adjacent the other side of said plates, said means connecting the plates means to the first hinge member comprising fastening means connecting the first and second portion of said plate means to said plurality of plates.

30. The assembly of claim 29 including:
spacer means located between adjacent plates to separate adjacent plates from each other.

31. The assembly of claim 27 wherein:
said second hinge member includes a plurality of second plates having portions located between adjacent plates of said plurality of plates of the first hinge member.

32. The assembly of claim 31 wherein:
said pivot means comprises a pivot pin extended through aligned holes in the plates of the first and second hinge members.

33. The assembly of claim 26 wherein:
the second hinge member includes a plurality of plates, said pivot means pivotally connecting said plates to the first hinge member.

34. The assembly of claim 26 wherein:
the means adapted to connect the earthworking tool to the second hinge member includes side members located adjacent opposite portions of the second hinge member, means connecting the side members to the second hinge member, and means connecting the side members to the tool.

35. The assembly of claim 34 wherein:
the second hinge member includes a plurality of plates located between the side members, said pivot means pivotally connecting said plates to the first hinge member, said means connecting the side members to the second hinge member comprising fastening means connecting the side members to the plates.

36. The assembly of claim 35 wherein:
the first hinge member includes a plurality of plates having portions located between adjacent plates of the second hinge member.

37. The assembly of claim 36 wherein:
said pivot means comprises a pivot pin extended through aligned holes in the plates of the first and second hinge members.

38. The assembly of claim 36 including:
spacer means located between adjacent plates to separate adjacent plates from each other.

39. The assembly of claim 26 wherein:
the first hinge member has a pair of first hubs, each of said first hubs having a convex curved outer surface, the second hinge member has a pair of second hubs located adjacent said first hubs, each of said second hubs having a convex curved outer surface, said spring means comprising a pair of split ring springs engageable with the convex outer surfaces of said first and second hubs to bias the second hubs toward a first position in engagement with the first hubs.

40. The assembly of claim 39 wherein:
said outer surfaces of said first and second hubs have arcuate grooves accommodating said split ring springs.

41. The assembly of claim 39 wherein:
said second hinge member has a recess located between the second hubs, said first hinge member having a portion located between the first hubs, said portion extended into said recess, said pivot means comprising a pin located in aligned holes in said portion and the second hinge member.

42. The assembly of claim 39 wherein:
one of said first and second hinge members has recess means, said other first and second hinge member having projection means extended into the recess means, said pivot means comprising a pin located in aligned holes in said projection means and one of said first and second hinge members.

43. The assembly of claim 39 including:
arm means secured to the second hinge member, said earthworking tool comprising a rotary hoe wheel rotatably mounted on said arm means.

44. The assembly of claim 26 wherein:
split spring means comprising a split sleeve spring.

45. The assembly of claim 26 wherein:
the split spring means comprises a plurality of split ring springs.

46. The assembly of claim 45 wherein:
the first hinge member and second hinge member each have grooves accommodating said split ring springs.

47. The assembly of claim 26 wherein:
the split spring means have a first end and a second end, said first hinge member having a projection engageable with the first end of the split means, and said second hinge member having a projection engageable with the second end of the split spring means.

* * * * *